United States Patent [19]

Avakian et al.

[11] Patent Number: 5,385,961
[45] Date of Patent: Jan. 31, 1995

[54] AMINO SILICONE/PHOSPHITE COMPOSITIONS

[75] Inventors: Roger W. Avakian; James A. Mahood, both of Parkersburgh, W. Va.

[73] Assignee: General Electric Company, Pittsfield, Mass.

[21] Appl. No.: 9,510

[22] Filed: Jan. 27, 1993

[51] Int. Cl.[6] .......................... C08K 9/06; C08K 5/51; C08G 77/04
[52] U.S. Cl. .................... 523/213; 524/128; 428/391
[58] Field of Search ................ 523/213, 205; 524/128, 524/262; 428/391

[56] References Cited

U.S. PATENT DOCUMENTS

| | | | |
|---|---|---|---|
| 2,114,866 | 4/1938 | Vaughan | 260/98 |
| 3,484,471 | 12/1969 | Murphy | 260/448.8 |
| 3,544,498 | 12/1970 | Holdstock et al. | 260/29.2 |
| 3,553,298 | 1/1971 | Hodan et al. | 260/967 |
| 3,558,556 | 1/1971 | Berger et al. | 260/46.5 |
| 3,560,432 | 2/1971 | Briggs et al. | 260/45.8 |
| 3,560,434 | 2/1971 | Abramoff | 260/45.8 |
| 3,668,229 | 6/1972 | Berger et al. | 260/448.8 R |
| 3,725,287 | 4/1973 | Traver | 252/78 |
| 3,787,537 | 1/1974 | De Marcq | 260/954 |
| 3,886,114 | 5/1975 | Beadle | 260/45.7 P |
| 3,969,315 | 7/1976 | Beadle | 260/45.8 NW |
| 4,011,279 | 3/1977 | Berger et al. | 260/824 R |
| 4,116,926 | 9/1978 | York | 260/45.7 |
| 4,278,783 | 7/1981 | Taniyama et al. | 528/23 |
| 4,471,132 | 9/1984 | Hallgren | 556/410 |
| 4,523,002 | 6/1985 | Campbell et al. | 528/26 |
| 4,584,393 | 4/1986 | Webb et al. | 556/407 |
| 4,600,436 | 7/1986 | Traver et al. | 106/3 |
| 4,631,346 | 2/1986 | Webb et al. | 556/420 |
| 4,701,511 | 10/1987 | Valenty | 528/26 |
| 4,707,509 | 11/1987 | Fisch et al. | 524/147 |
| 4,708,979 | 11/1987 | Pedrazzetti et al. | 524/249 |
| 4,778,838 | 10/1988 | Greco et al. | 524/99 |
| 4,808,686 | 2/1989 | Cella et al. | 528/27 |
| 4,810,579 | 3/1989 | Neri et al. | 428/405 |
| 4,992,522 | 2/1991 | Williams et al. | 528/32 |
| 5,026,890 | 6/1991 | Webb et al. | 556/408 |
| 5,130,198 | 7/1992 | Swisher et al. | 523/200 |

FOREIGN PATENT DOCUMENTS

| | | |
|---|---|---|
| 0096818 | 12/1983 | European Pat. Off. . |
| 0278578 | 2/1988 | European Pat. Off. ............ 428/405 |
| 0278579 | 2/1988 | European Pat. Off. . |
| 2041536 | 8/1988 | France . |

*Primary Examiner*—Paul R. Michl
*Assistant Examiner*—LaVonda R. DeWitt

[57] ABSTRACT

An organic phosphite composition is provided comprising organic phosphite particles having organic phosphite cores coated with an aminofunctional organic polysiloxane. Blends of the phosphite and the aminofunctional organic polysiloxane are also provided. The phosphite particles exhibit high levels of resistance to hydrolysis and are useful as antioxidant additives for thermoplastic compositions.

15 Claims, No Drawings

AMINO SILICONE/PHOSPHITE COMPOSITIONS

BACKGROUND OF THE INVENTION

FIELD OF THE INVENTION

The present invention relates to solid organic phosphites resistant to hydrolysis, and to the process for preparing them.

The organic phosphites are compounds which are used in the art in order to endow the organic polymers with stability characteristics, against the oxidative degradation caused by light and/or heat, such as disclosed, e.g., in U.K. Patent No. 803,557 and U.S. Pat. No. 3,516,963.

The organic phosphites suffer from the undesired characteristic of undergoing phenomena of hydrolysis, in particular during their storage under warm and moist conditions, with the consequent loss of stabilizing activity, and danger of handling problems arising.

It is known to coat solid phosphite powders with dialkoxy or diphenoxy substituted silicones such as those of the formula:

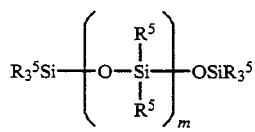

wherein $R^5$ is an alkoxy or phenoxy group and m is greater than 4. Such disubstituted silicones can however undergo a reaction with water, thereby generating an alcohol or phenol which can in turn react with the phosphite. Thus while coatings of disubstituted silicones can provide solid phosphites with some degree of protection from hydrolysis, they themselves can result in degradation through their secondary hydrolysis by-products. Other processes for coating phosphites include treating said powder phosphites with a monomeric silane containing in its molecule at least two alkoxy groups and causing the silane to hydrolyze, thereby causing the formation of a siliconic polymer on the surface of powder particles but most likely liberating alcohol which promotes phosphite alcoholysis.

It is also known to blend organo amines with phosphites to improve the hydrolytic stability thereof, see York U.S. Pat. No. 4,116,926, issued Sep. 26, 1978, which discloses a phosphite composition comprising a small proportion of trisopropanolamine; and Hodan et al, U.S. Pat. No. 3,553,298, issued Jan. 5, 1971, which discloses phosphite ester compositions containing particular nitrogen-containing compounds which stabilize the phosphite ester against hydrolysis.

Consequently, there is a desire to improve the hydrolytic stability of silicone coated solid phosphites and silicone containing organic phosphite compositions.

SUMMARY OF THE INVENTION

The present invention provides compositions comprising an organic phosphite stabilizer and an amine functional organo polysiloxane either in the form of (i) organic phosphite particles having a solid phosphite core and an amine functional organo polysiloxane coating attached to the core and surrounding the core or, (ii) a blend composition. The amine functional organo polysiloxane protects the phosphite from hydrolysis.

Detailed Description of the Invention

Solid organic phosphites in powder form, with a particle size of from 50 μm to 1 mm, are treated with an amine functional organo siloxane which is to provide siloxane coated phosphite particles.

Advantageously, for such a purpose an amount of amine functional organo siloxane of from 0.1 to 10% by weight based on the combined total weight of the solid phosphite and amine functional organo siloxane, and, preferably, an amount of the order of from 0.5 to 2% by weight thereof, is used.

The coated phosphite particles exhibit high levels of resistance to hydrolysis.

Suitable phosphites are those which are in solid form at room temperature, and which can be made into a particulate form, preferably a powder form.

Defined by means of the general formula:

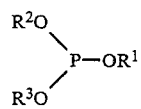

wherein: $R^1$, $R^2$ and $R^3$ represent either equal or different hydrocarbyl radicals, which can be either substituted or non-substituted alkyl, cycloalkyl, aryl, alkaryl or aralkyl radicals.

In particular, trialkyl phosphites, dialkyl monophenyl phosphites, diphenyl monoalkyl phosphites and triphenyl phosphites, possibly bearing hydrocarbyl substituents on the benzene ring, are known and used in the art.

Specific examples of such organic phosphites are: diphenyl 2-ethylhexyl phosphite, triphenyl phosphite, tris(2,5-di-tert-butylphenyl)phosphite, tris(2-tert-butylphenyl)phosphite, tris(2-phenylphenyl)phosphite, tris(2-(1,1-dimethylpropyl)phenyl)phosphite, tris(2-cyclohexylphenyl)phosphite, tris(2-tert-butyl-4-phenylphenyl)phosphite, tris(2-tert-butyl-4-methylphenyl)phosphite, tris(2,4-di-tert-amylphenyl)phosphite and tris(2,4-di-tertbutylphenyl)phosphite.

Another class of organic phosphites which can be stabilized according to the present invention is definable by means of the general formula:

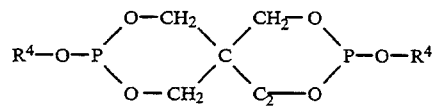

wherein: each R4 radical, is equal to, or different from, each other, represent hydrocarbyl radicals, which can be either substituted or nonsubstituted alkyl, cycloalkyl, aryl, alkaryl or aralkyl radicals.

Specific examples of such organic phosphites are: bis(2,4-di-tert-butylphenyl)pentaerythritol diphosphite, bis(2,6-di-tert-butyl-4 methylphenyl)pentaerythritol diphosphite, bis(2,4,6-tri-tert-butylphenyl)pentaerythritol diphosphite and distearyl pentaerythritol diphosphite.

A phosphonite may be used in place of a phosphite. This phosphonite may be chosen from polyphenylene diphosphonites and their substituted derivatives. Examples of such compounds appear in the SANDOZ Pat.

No. BE-A-74,363. In particular, mention may be made of 4,4'-diphenylenediphosphonites and tetrakis(isooctyl), tetrakis(2,4-ditert-butylphenyl), and tetrakis(3-nonylphenyl)4,4',4"-p-terphenylenediphosphonites.

An especially preferred phosphonite is tetrakis(2,4-ditert-butylphenyl)4,4'-diphenylenediphosphonite. A specific phosphonite is tetrakis(2,4-ditert-butylphenyl)-4,4'-diphenylenediphosphonite

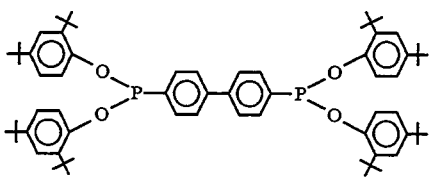

marketed by Ciba-Geigy under the name Irgafos PEPQ and by SANDOZ under the name Sandostab PEPQ.

The phosphite may also be in the form of a fluorophosphonite such as sold under the trademark Ethyl 398 sold by Ethyl Corporation. Pluorophosphorous compounds are also set out in Burton U.S. Pat. No. 4,912,155, issued Mar. 27, 1990, which is incorporated herein by reference.

Suitable particles may also be in the form of pastille type granules set out in Neri et al. U.S. Pat. No. 4,957,956 issued Dec. 18, 1990 which is incorporated herein by reference. The phosphites may be blended with other materials such as other stabilizers such as thermal, UV stablizers and primary antioxidants and neutralizers, prior to being coated. The phosphites used are generally hydrolysis prone phosphites.

Preferably the amino functional polyorgano siloxane is selected from alkoxy aminosilanes and aminosiloxanes having the general formula:

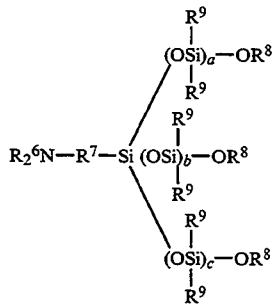

wherein each $R^6$ is independently selected from hydrogen, substituted and unsubstituted organic radicals, and radicals of the formula—$R^7NR^6{}_2$, where $R^6$ is as previously defined; $R^7$ is a divalent organic radical; each $R^8$ is independently selected from substituted and unsubstituted alkyl radicals preferably having from 1 to 30 carbon atoms; each $R^9$ is an independently selected organic radical having from 1 to 13 carbon atoms; and a, b and c are, independently, 0 or a positive integer.

It will be apparent to those skilled in the art that silanes are obtained when a, b and c are all equal to zero, and that siloxanes are obtained when at least one of a, b and c is a positive integer. Preferably, a, b and c have values ranging from 0 to 10 and, more preferably, from 0 to 5, since too many diorganosiloxy units will cause the resultant composition to be oily rather than a solid wax. Of course, suitable values for a, b and c can readily be ascertained by the artisan without undue experimentation. Preferably the sum of a, b and c is between 5 and 30, and more preferably from 10 to 15.

$R^6$ radicals suitable for practicing the present invention include hydrogen; substituted and unsubstituted organic radicals which preferably are substituted and unsubstituted hydrocarbon radicals such as alkyl radicals, for example, methyl, ethyl, propyl, butyl, and the like, aryl radicals, for example, phenyl, tolyl, xylyl, and the like, alkaryl, for example, β-phenylethyl and the like, alkaryl, for example, benzyl and the like, substituted radicals of any of the foregoing, for example, chloroethyl, 3,3,3-trifluoropropyl, β-cyanoethyl, and the like; and —$R^7NR^6{}_2$ radicals where $R^7$ is a divalent organic radical such as a hydrocarbon and R is as previously defined, for example, aminoethyl, aminopropyl and the like.

$R^7$ is a divalent organic radical which preferably is a substituted or unsubstituted hydrocarbon radical such as alkylene, for example, methylene, ethylene, propylene, butylene, and the like; arylene, for example, phenylene, naphthylene, and the like; or a halogen substituted radical of any of the foregoing.

Examples of suitable $R^6{}_2NR^7$-moieties bonded to silicon thus includes

H$_2$N—CH$_2$—CH$_2$—CH$_2$—
CH$_3$NH—CH$_2$—CH$_2$—CH$_2$—
(CH$_3$)$_2$N—CH$_2$—CH$_2$CH$_2$—
H$_2$N—CH$_2$—CH$_2$—NH—CH$_2$—CH$_2$—CH$_2$—
CH$_3$NH—CH$_2$—CH$_2$—NH—CH$_2$—CH$_2$CH$_2$—
(CH$_3$)$_2$N—CH$_2$—CH$_2$—NH—CH$_2$—CH$_2$—CH$_2$—

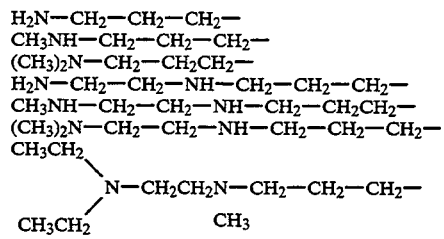

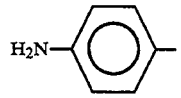

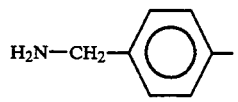

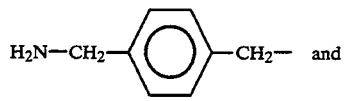

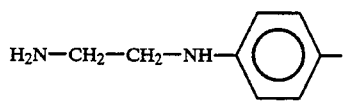

The foregoing list is only for purposes of illustration and is not intended to be all inclusive. Other variations within the scope of the appended claims will be obvious to those of ordinary skill in the art.

$R^8$ radicals employed in the practice of the present invention can be any substituted or unsubstituted alkyl radicals having at least 12 carbon atoms and, preferably, from 14 to about 30 carbon atoms. Most preferably, $R^8$ is an unsubstituted linear hydrocarbon radical having from 14 to 25 carbon atoms, for example, dodecyl, pentadecyl, octadecyl, eicosyl, and the like. Other suitable $R^8$ radicals can readily be ascertained without undue experimentation.

R$^9$ can be any substituted or unsubstituted organic radical having from 1 to 13 carbon atoms and preferably is a substituted or unsubstituted hydrocarbon, such as methyl, ethyl, propyl, butyl, chloroethyl, 3,3,3-trifluoropropyl, vinyl, phenyl, cyanoethyl, or mixtures thereof. Most preferably R$^9$ is methyl or a mixture of a major amount of methyl and a minor amount of phenyl, cyanoethyl, trifluoropropyl, vinyl or mixture thereof.

A preferred amino functional polysiloxane is set out below:

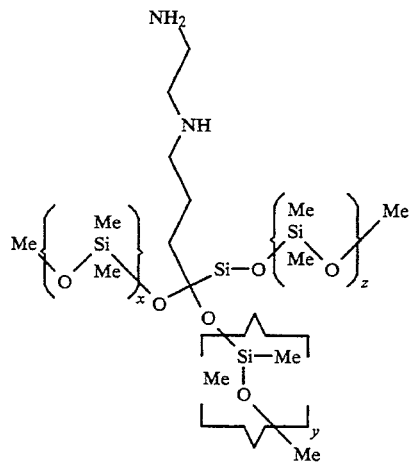

Molecular weight=1100–1200
Si content=30%
Prepared as an in situ mixture
x+y+z=12

Suitable amino functional organosiloxanes also include those set out in Hallgren U.S. Pat. No. 4,539,379, issued Sep. 3, 1985, which is incorporated herein by reference and which discloses an aminoorgano terminated polydiorganosiloxane having the formula,

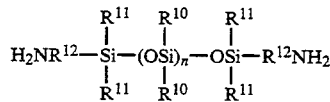

where R$^{10}$ is selected from C$_{(1-13)}$ monovalent hydrocarbon radicals and substituted C$_{(1-13)}$ monovalent hydrocarbon radicals, R$^{11}$ is selected from R$^{10}$ radicals and C$_{(1-8)}$ alkoxy radicals, R$^{12}$ is a C$_{2(2-13)}$ divalent organo radical and n of this formula is an integer equal to from 5 to about 2000 inclusive.

Radicals included by R$^{10}$ are C$_{(1-8)}$ radicals such as methyl, ethyl, propyl, butyl, pentyl, etc.; alkenyl radicals such as vinyl, allyl, substituted alkyl radicals, for example, trifluoropropyl, cyanoethyl, etc.; aryl radicals and halogenated aryl radials such as phenyl, chlorophenyl, xylyl, naphthyl, etc. Radicals included within R$^{11}$ are, for example, the aforementioned R$^{10}$ radicals and C$_{(1-8)}$ alkoxy radicals such as methoxy, ethoxy, propoxy, and butoxy. Radicals included by R$^{12}$ are, for example, alkylene radicals such as dimethylene, trimethylene, tetramethylene, pentamethylene; arylene radicals such as phenylene; alkaryl radicals such as ethylphenylene, etc.

A preferred procedure for making the aminorgano terminated polydiorganosiloxanes are by effecting reaction between a silanol terminated polydiorganosiloxane having the formula,

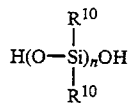

and an alkoxy organoaminosilane of the formula,

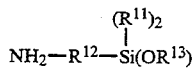

where R$^{10}$, R$^{11}$, R$^{12}$ and n are as previously defined, R$^{13}$ is a C$_{(1-8)}$ alkyl radical.

Some of the alkoxyalkylaminosilanes included are, for example, (C$_2$H$_5$)$_3$SiCH$_2$CH$_2$CH$_2$NH$_2$;
(C$_2$H$_5$)$_3$SiCH$_2$CH$_2$CH$_2$CH$_2$NH$_2$;
(CH$_3$O)$_3$SiCH$_2$CH$_2$CH$_2$HN$_2$;
CH$_3$O(CH$_3$)$_2$SiCH$_2$CH$_2$CH$_2$NH$_2$;
(CH$_3$O)$_2$CH$_3$SiCH$_2$CH$_2$CH$_2$CH$_2$NH$_2$;

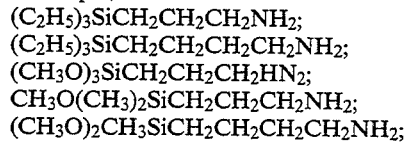

Suitable amino functional organosiloxane also include those set out in Lane et al, U.S. Pat. No. 4,705,704, which is incorporated herein by reference.

A particularly preferred embodiment of the aminofunctional polysiloxanes of the present invention relates to compositions having the general formula

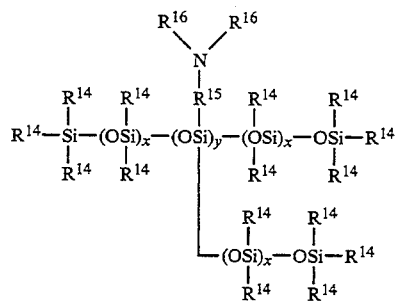

where each R$^{14}$ is an independently selected substituted or unsubstituted hydrocarbon radical; each R$^{15}$ is an independently selected divalent arylene, alkarylene or alkylene radical; each R$^{16}$ is independently selected from hydrogen, substituted and unsubstituted hydrocarbon radicals, and amino radicals of the formula—R$^{15}$N(R$^{16}$)$_2$, where R$^{15}$ and R$^{16}$ are as previously defined; each x is an independently selected integer equal to or greater than zero; y is an integer equal to or greater than 1; and the viscosity is from about 10 centipoise to about 5000 centipoise at 25° C.

The R$^{14}$ radicals can be any substituted or unsubstituted hydrocarbon radical conventionally bonded to the silicon atoms of polysiloxanes and includes, for example, alkyl radicals such as methyl, ethyl, propyl, butyl and the like; aryl radicals such as phenyl; alkenyl radicals such as vinyl and allyl; aralkyl radicals such as phenylethyl; alkaryl radicals such as benzyl; and radicals wherein one or more hydrogen atoms of any of the foregoing is replaced with a halogen, cyano, amino or the like, for example, cyanoethyl, trifluoropropyl, and chlorophenyl. Most preferably, the $R^{14}$ radicals are all methyl or a mixture of a major amount of methyl and a minor amount of phenyl, cyanoethyl, trifluoropropyl, vinyl or mixture thereof.

$R^{15}$ can be any divalent arylene, alkanylene or alkylene radical; preferably an alkylene radical of the general formula
—$C_nH_{2n}$—
such as
—$CH_2$—,
—$CH_2CH_2$—,
—$CH_2CH_2CH_2$—,
—$CH_2CH(CH_3)CH_2$—,
or
—$CH_2CH_2CH_2CH_2$—

Generally, n of this $R^{15}$ unit can have a value of from 1 to about 10, but preferably is from 3 to 6, inclusive. Most preferably n equals 3 because it is readily available or easily synthesized. It is also contemplated that nonreactive atoms may be present in the alkylene bridge, for example, an —O— or —S— may be present between alkylene units.

$R^{16}$ can be hydrogen, any of the radicals defined by $R^{14}$, or an amino group or substituted amino group of the formula—$R^{15}N(R^{16})_2$. Preferably, one of the $R^{16}$ radicals bonded to nitrogen is hydrogen and the other $R^{16}$ radical bonded to nitrogen is a radical of the formula—$(CH_2)_nNH_2$, where n of this $R^{16}$ unit is an integer from 1 to 10 and, preferably, from 2 to 4, inclusive.

From the foregoing the artisan will appreciate that representative amino and substituted amino groups which are bonded to triorganosiloxy units through an alkylene bridge in accordance with the present invention include —$CH_2CH_2CH_2NH_2$
—$CH_2CH_2CH_2NHCH_2CH_2NH_2$
—$CH_2CH_2$—O—$CH_2CH_2NHCH_2CH_2CH_2NH_2$
—$CH_2CH_2CH_2NHCH_2\overset{\displaystyle CH_2CH_2NH_2}{\overset{\displaystyle |}{CH}}CH_2CH_2NH_2$ $$-CH_2\overset{\displaystyle CH_3}{\underset{\displaystyle |}{C}}HCH_2NHCH_2CH_2NHCH_3$$

and

—$CH_2CH_2N\overset{\displaystyle CH_2CH_2NH_2}{\underset{\displaystyle CH_2CH_2NH_2}{<}}$ Other variations will be obvious to those of ordinary skill in the art.

The aminofunctional polysiloxanes of the present invention can be prepared by any suitable method. The present inventors have found that a particularly effective method involves equilibrating a trialkylsiloxy terminated polydiorganosiloxane such as hexamethyldisiloxane; a cyclopolysiloxane such as octamethylcyclotetrasiloxane; and a trialkoxyaminosilane such as aminoethylaminopropyltrimethoxysilane. Preferably, the equilibration is effected at a temperature greater than about 150° C. in the presence of a basic equilibration catalyst such as potassium hydroxide. Those skilled in the art will readily be able to conduct such an equilibration without undue experimentation.

Alternatively, a polydiorganosiloxane having suitably reactive trifunctional siloxy units, such as ≡SiH or ≡$SiCH_2CH_2CH_2Cl$, may be reacted with $CH_2$=$CHCH_2NHCH_2CH_2NH_2$ or $H_2NCH_2CH_2NH_2$, respectively, to provide an analagous polysiloxane wherein the reactive groups have each been converted to —$CH_2CH_2CH_2NHCH_2CH_2NH_2$ groups. Small amounts of unreacted ≡SiH or ≡$SiCH_2CH_2CH_2Cl$ groups may remain as an impurity.

The artisan will appreciate that it is not critical that the aminofunctional siloxy units be present in blocks and may, if desired, by randomly dispersed on the polymer chain. Also, it should be understood that there may be present other siloxy units, for example, $CH_3SiO$ units, $$(R^6)_2NR^7-\overset{\displaystyle CH_3}{\underset{\displaystyle |}{\underset{\displaystyle CH_3}{Si}}}O- \text{ units and } -\overset{\displaystyle CH_3}{\underset{\displaystyle |}{\underset{\displaystyle R^7N(R^6)_2}{Si}}}O- \text{ units,}$$

without departing from the spirit of the invention or the scope of the appended claims. Preferably, at least about 50 mole percent of the aminofunctional siloxy units are trifunctional siloxy units, and more preferably, at least about 75 mole percent of the aminofunctional siloxy units are trifunctional siloxy units. In especially preferred embodiments of the present invention the amine equivalent of the polysiloxane ranges from about 0.1 to about 2.5 and, more preferably, from about 0.5 to about 1.5. By "amine equivalent" is meant milliequivalent of amine per gram of fluid. Those skilled in the art will readily be able to ascertain the amine equivalent, for example, by a strong acid titration using an acid such as perchloric acid.

Amino functional organosiloxanes are also disclosed in Florence et al, U.S. Pat. No. 4,496,705, which is incorporated herein by reference and which discloses difunctional aminoalkyl-silanes and the objects of the invention and other objects are accomplished by hydrolyzing a difunctional aminoalkyl-silane of the formula:

$$R^bO-\overset{\displaystyle R^c}{\underset{\displaystyle R^a}{\underset{\displaystyle |}{Si}}}-OR^b$$

wherein each $R^b$ is a monovalent hydrocarbon radical independently selected from the group consisting of alkyl radicals of from 1 to 20 carbon atoms and aryl radicals of from 6 to 20 carbon atoms, $R^a$ is an aminoalkyl radical of the general formula:
—$(R^{17}-NH)_n-R^{18}-NH_2$
wherein $R^{17}$ and $R^{18}$ are divalent hydrocarbon radicals selected from the group consisting of alkylene radicals of from 1 to 10 carbon atoms and divalent aryl radicals of from 6 to 20 carbon atoms and n for this $R^a$ unit is an integer of from 0 to 5 inclusive; and $R^c$ is a monovalent radical selected from the group consisting of hydrogen, alkyl radicals of from 1 to 20 carbon atoms, aryl radicals of from 6 to 20 carbon atoms and the aminoalkyl radicals within the scope of $R^a$.

The preferred difunctional aminoalkyl-silanes are those wherein each $R^b$ is a methyl radical. Examples of such aminoalkyl-silanes include, N-aminoethyl-γ-aminopropylmethyldimethoxysilane, N-aminoethyl-γ-aminopropylethyldimethoxysilane, N-aminoethyl-γ-aminopropylpropyldimethoxysilane, N-aminoethyl-γ-aminopropylbutyldimethoxysilane, aminopropylmethyldimethoxysilane, aminopropylethyldimethoxysilane, aminopropylbutyldimethoxysilane, aminopropylphenyldimethoxysilane, N-aminoethyl-y-aminopropylphenyldimethoxysilane, aminoethylmethyldimethoxysilane, aminoethylpropyldimethoxysilane, aminoethylbutyldimethoxysilane, aminoethylphenyldimethoxysilane, etc. The methoxyaminoalkyl-silanes with $R^b$ as a methyl radical are preferred because they are more readily available than the other aryloxy and alkoxy-substituted difunctional aminoalkylsilanes suitable for use in this invention.

Hydrolysis of the difunctional aminoalkylsilanes can be accomplished by simply adding water and base or acid to said difunctional aminoalkyl-silanes. Where hydrolysis of all the alkoxy/aryloxy functional groups is desired, two moles of water per mole of silane is required. It is preferable to utilize an excess of water, i.e., in a molar ratio of 10 to 1. The hydrolysis reaction requires an acid or base to catalyze the reaction. Suitable acids include hydrogen chloride, hydrogen bromide, hydrogen fluoride, perchloric, chloric, chlorous, hypochlorous, bromic, carbonic, hypophosphorous, phosphorous, phosphoric, etc. and carboxylic acids such as acetic acid, trifluoroacetic acid, formic acid, propanoic acid, butanoic acid, 2-methyl propanoic acid, pentanoic acid, chloroacetic acid, dichloroacetic acid, trichloroacetic acid, stearic acid, palmitic acid, benzoic acid, phenyl acetic acid, 2-chlorobutanoic acid, 3-chlorobutanoic acid, 4-chlorobutanoic acid, etc. Suitable bases include sodium hydroxide, potassium hydroxide, ammonia, organic amines of the formula $R^d_3N$, wherein $R^d$ is hydrogen an alkyl radical selected from the group consisting of 1 to 8 carbon atoms and aryl radicals of from 6 to 20 carbon atoms. The preferred quantity of base or acid utilized to catalyze the hydrolysis reaction falls within the range 0.001 to 0.1 moles per mole of difunctional aminoalkyl-silane. Although concentrations outside of this range will provide hydrolysis, the rate of reaction will be too slow or there will be a waste of acid or base.

The hydrolysis reaction preferably takes place at about room temperature to minimize polymerization of the hydrolyzed aminoalkylsilanes although higher temperatures are not excluded. The preferred base is potassium hydroxide, which functions well at room temperature.

It may be desirable to only partially hydrolyze the difunctional aminoalkyl-silanes where aminoalkyl-siloxane polymers of a lower molecular weight are desired. Partial hydrolysis can be achieved by interrupting the reaction, utilizing small quantities of water, utilizing small quantities of acid or base catalyst or by utilizing weaker acids or bases. By partially hydrolyzing the difunctional aminoalkyl-silanes, the ability to incorporate the silanes within a siloxane polymer is significantly reduced.

Hydrolysis of alkoxy and aryloxy radicals which appear on the difuntional aminoalkylsilanes produces alcohols that correspond to the alkoxy and aryloxy radicals. Where the preferred difunctional aminoalkyl-silanes are utilized, methanol is produced from the methoxy groups. Once alcohol is produced, it is necessary to remove a portion of the alcohol to prevent the functional groups (alkoxy and aryloxy) from reforming during polymerization. Permitting the alkoxy or aryloxy groups to reform during polymerization reduces the effectiveness of hydrolyzing the difunctional aminoalkyl-silanes. Where it desired to maximize the chain length of the aminoalkyl-siloxane polymers produced, it is preferable to remove substantially all of the alcohol produced by the hydrolysis reaction. However, where less than the maximum chain length of said aminoalkyl-siloxane polymers is desired, a portion of the alcohol produced may be left within the reaction mixture to reduce the effectiveness of hydrolyzing the difunctional aminoalkyl-silanes.

To remove the alcohol from the reaction mixture a vacuum need only be applied where the alcohol provides a high vapor pressure during the hydrolysis reaction. Where this does not occur, it is necessary to distill the alcohol from the reaction mixture. Conventional equipment can be utilized for either applying a vacuum or distilling the alcohol from the reaction mixture.

Once the desired quantity of alcohol is removed from the reaction mixture, the hydrolyzed aminoalkyl-silane is polymerized with a hydroxy-endcapped siloxane oligomer. Suitable hydroxy endcapped siloxane oligomers include low molecular weight siloxanes exhibiting a degree of polymerization as low as 3 and 4. It is preferable to utilize those hydroxy-endcapped siloxane oligomers having an average degree of polymerization in the range of about 30 to 800. The degree of polymerization may actually be well above 800 and below 30. Oligomer segments in the finished product may have as many as 2000 monomeric units.

Suitable amino organosiloxanes also include amino cyclopoly siloxanes such as those set out in Murphy et al, U.S. Pat. No. 3,484,471, issued Dec. 16, 1969, which is incorporated herein by reference.

The amine functional organohydrogen polysiloxane coatings may be obtained by applying an organo siloxane amine functional organo siloxane mixture to the phosphite particulates by spraying, followed by heat curing of the siloxane to form the polysiloxane coating.

Alternatively, the coating may be applied by placing the organic phosphite, in a powder form, suspended in an inert solvent wherein the same phosphite is insoluble, or substantially insoluble, wherein the solvent contains the amine functional organo siloxane. Examples of such solvents are liquid aliphatic hydrocarbons, such as hexane and heptane.

The suspension is kept stirred, by operating at room temperature (20°–25° C.), for a time of from 10 to 120 minutes. The solvent is then evaporated off under reduced pressure and a powder is recovered, which is heated to a temperature preferably comprised within the range of from 100° to 140° C., by operating under a reduced pressure and for a time of from 10 minutes to 12 hours, such as to remove any possible solvent traces, and cause the siliconic polymer to form on the surface of the particles of the organic phosphite.

According to a further form of practical embodiment, the amine functional organo siloxane, preferably diluted in an inert organic solvent, is sprayed on the organic phosphite powder. These operations are advantageously carried out at room temperature (20°–25° C.), and the so-treated powder of the organic phosphite is then heated under a reduced pressure, in a way similar as to that above disclosed with regard to the first form of practical embodiment.

When the treatment process is carried out under the above indicated conditions, the treated organic phosphite will advantageously have a melting point higher than approximately 100° C.

Particularly good results are obtained by applying the process of the present invention to the stabilization of the following phosphites: bis(2,4-di-tert-butylphenyl)-pentaerythritol diphosphite; di-stearyl pentaerythritol diphospite; and bis(2,6-di-tert-butyl-4-methylphenyl)-pentaerythritol diphosphite and tris(2,4-di-tert-butylphenyl)phosphite.

The resultant organic phosphite composition has organic phosphite particles having solid phosphite particulate cores and amino functional organo polysiloxane coatings attached to the core, surrounding the core, and protecting the core from moisture. The coating acts as a shell or outer barrier layer which protects the inner phosphite core from atmospheric moisture.

The composition may be either in the form of a coated particle or in the form of a blend. The preferred amino functional polyorganosiloxane has the following formula:

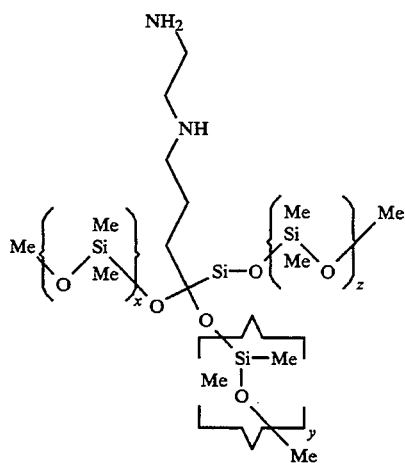

Molecular weight = 1100–1200
Si content = 30%
Prepared as an in situ mixture
x+y+z=12

The phosphite blend composition preferably comprises a phosphite at a level of from 25 to 99.9% by weight based on the total weight of the blend composition, more preferably from 50 to 99% by weight thereof, and most preferably from 95 to 99% by weight thereof; and the phosphite blend composition preferably comprises the amino functional polyorganosiloxane at a level of from 0.1% to 20% by weight based on the total weight of the blend, more preferably from 1 to 10% by weight thereof, and most preferably from 1 to 5% by weight thereof. The amino functional organosiloxane is present in the blend compositions at a level effective in enhancing the hydrolytic stability of the phosphite. Other additives may be included in the composition, including neutralizers, phenolics antioxidants, thermal stabilizers and UV stabilizers.

The organic phosphite compositions may be used as thermal oxidative stabilizers for organic materials such as thermoplastic compositions. Suitably, thermoplastic resin compositions include those comprising polyethylene, polypropylene, polycarbonate, polybutylene terephthalate, polyethylene terephthalate, polyvinyl chloride, polystyrene, polyamide and acrylonitrile-butadiene-styrene graft copolymers. Preferably the phosphite compositions are employed. The thermoplastic compositions at levels of from 0.01% to 5% by weight based on the total weight of the thermoplastic resin composition preferably from 0.03% to 0.2% by weight thereof. The phosphite compositions are employed in thermoplastic resin compositions at levels effective to enhance the thermal oxidative stability of the thermoplastic resin composition during processing thereof.

The phosphite core may comprise further additives such as phenolic antioxidants, neutralizers, i.e., metal carboxylates, metal hydroxy carboxylates, oxides, chelates, hydrotalcites, hindered amine stabilizers, and organic bases such as triisopropanolamine.

The preferred phosphites include bis(2,4-di-tert-butyl phenyl) pentaerythritol diphosphite, distearyl pentaerythritol diphosphite; bis(2,6-di-tert-butyl-4-methylphenyl)pentaerythritol diphospite and tris(2,4-di-tert-butylphenyl) phosphite.

The following examples illustrate the present invention, but are not meant to limit the scope thereof.

EXAMPLES

Samples of silicone fluids (DMPS, a dimethylpolysiloxane, and APS, an amine-containing polysiloxane) were obtained from GE silicones and tested at 0–5% loadings on granular bis(2,4-di-tert-butyl phenyl) pentaerythritol diphosphite with approximately 1% by weight triisopropanolamine available from GE Specialty Chemicals as Ultranox ® 626A phosphite (PDP). The silicone was simply added to the PDP in a small vial, which was then placed in an automatic shaker for an hour. At this point 0–5% of SHT (synthetic hydrotalcite sold by Kyowa Industries Limited as DHT4A Mg 4.5Al2 OH13 CO3—3.5$H_2O$ treated with stearic acid) were also added to the vials, and the samples shaken again for an hour. Significantly less dusting was observed in vials containing silicones.

This was intended as a screening test, and no quantitative measurement of silicone dispersion was made. As a simple qualitative test, a small amount of carbon black was added to one sample, and appeared to be well distributed within five minutes of shaking.

After the two hours of shaking, the coated PDP phosphite samples were transferred to aluminum dishes and placed in the humidity chamber at 30 C/75RH percent (relative humidity), and weight changes monitored daily, It should be noted that because of the large number of samples, only one silicone fluid was tested at a time. Several months passed between the testing of the first silicone and the last, which is reflected in the loss of hydrolytic stability of the base PDP phosphite in the data.

The lack of hydrolytic stability of the neat silicone fluids further complicates data analysis. The samples of APS showed significant weight loss when stored as a neat additive under these temperature/humidity conditions. This weight loss is the most probable cause of the small initial weight loss seen in some of the coated samples.

Amines additives such as triisopropanol amine are known to improve the hydrolytic stability of phosphites. APS could function either by neutralizing acid formed by phosphite hydrolysis (thereby preventing the acid from catalyzing further hydrolysis) or by simply coating the PDP surface and preventing moisture from reaching the solid phosphite. Delta t represents the additional days to 1% weight gain provided by the additives.

TABLE I

| APS loading level | SHT loading level | Time to 1% weight gain | Delta t |
|---|---|---|---|
| 0% | 0% | 5.5 days | 0 |
| 1% | 0% | 6.1 days | 0.6 days |
| 3% | 0% | 6.8 days | 1.3 days |
| 5% | 0% | 7.8 days | 2.3 days |
| 0% | 1% | 5.9 days | 0.4 days |
| 0% | 5% | 6.0 days | 0.5 days |
| 5% | 5% | 7.8 days | 2.3 days |

APS provided a considerable increase in hydrolytic stability, with loading of 1% increasing the time to 1% weight gain by roughly 11%, while a 5% APS coating increased stability time by roughly 42%. It is not known whether better dispersion would have provided these kinds of stability increases at lower silicone levels. Small levels of SHT were seen to be beneficial, whereas higher loadings contributed little additional hydrolytic stability. The beneficial effects of SHT and the APS were not seen to be additive, suggesting they share a similar primary mode of action as a neutralizer.

DMPS contributed to hydrolytic stability, but to a lesser extent than APS. DMPS lacks the ability to neutralize acids, and can function only by coating the surface to prevent moisture from reaching the PDP phosphite. Note the loss in stability time of the neat phosphite as the base PDP phosphite sample aged between tests.

TABLE II

| DMPS loading level | SHT loading level | Time to 1% weight gain | Delta t |
|---|---|---|---|
| 0% | 0% | 3.9 days | 0 |
| 1% | 0% | 4.0 days | 0.1 days |
| 3% | 0% | 4.2 days | 0.3 days |
| 5% | 0% | 4.6 days | 0.7 days |
| 0% | 1% | 4.2 days | 0.3 days |
| 0% | 5% | 4.3 days | 0.4 days |
| 5% | 5% | 5.3 days | 1.4 days |

This data shows a good correlation between DMPS loading levels and time to 1% weight gain. The benefits of DMPS are significantly less than seen with APS.

Note the higher Delta t values for APS coated phosphites over Delta t values for DMPS coated phosphites.

The above APS may be represented by the formula

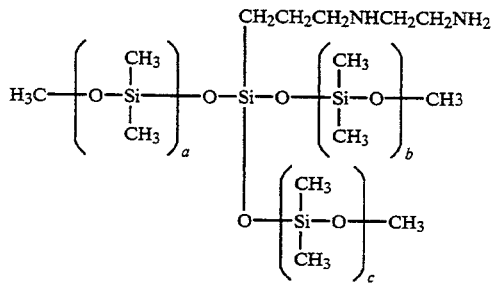

wherein $x+y+z=12$, the molecular weight is between 1100–1200, and the Si content is 30%.

We claim:

1. An organic phosphite composition comprising:
   a. an organic phosphite particle comprising
   i) a solid organic phosphite core, and
   ii) an amino functional organo polysiloxane coating attached to said core, said coating protecting said phosphite core from moisture,
wherein said coating consists essentially of an amino polysiloxane of the formula:

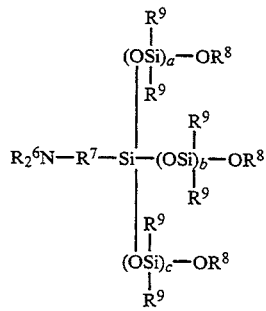

wherein each $R^6$ is independently selected from hydrogen, substituted and unsubstituted organic radicals, and radicals of the formula—$R^7NR^6{}_2$, where $R^6$ is as previously defined; $R^7$ is a divalent organic radical; each $R^8$ is independently selected from substituted and unsubstituted alkyl radicals having from 1 to 30 carbon atoms; each $R^9$ is an independently selected organic radical having from 1 to 13 carbon atoms; and a, b and c are, independently, 0 or a positive integer, wherein at least one of a, b and c is a positive integer.

2. The composition of claim 1 wherein $R^8$ is methyl, and $R^9$ is methyl.

3. The composition of claim 2 wherein $R^7$ is —$CH_2CH_2CH_2$—.

4. A thermoplastic composition comprising a thermoplastic resin and an effective amount of the organic composition of claim 1 to enhance the thermal oxidative stability of said thermoplastic composition.

5. The composition of claim 1 wherein said composition is in powder form.

6. An organic phosphite particle exhibiting enhanced hydrolytic stability, said particle comprising:
   i) a solid organic phosphite core, and
   ii) an amino functional organo polysiloxane coating surrounding said core,
wherein said amino functional polysiloxane coating consists essentially of amino functional organo polysiloxanes having the formula:

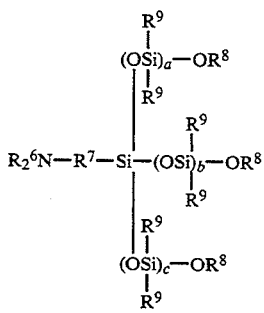

wherein each $R^6$ is independently selected from hydrogen, substituted and unsubstituted organic radicals, and radicals of the formula—$R^7NR^6{}_2$, where $R^6$ is as previously defined; $R^7$ is a divalent organic radical; each $R^8$ is independently selected from substituted and unsubstituted alkyl radicals having from 1 to 30 carbon atoms;

each $R^9$ is an independently selected organic radical having from 1 to 13 carbon atoms; and a, b and c are, independently, 0 or a positive integer., wherein at least one of a, b and c is a positive integer.

7. The particle of claim 6 wherein said organic phosphite core comprises bis(2,4-di-t-butylphenyl) pentaerythritol diphosphite.

8. A phosphite blend composition comprising
   a) from 25 to 99.9% by weight of at least one phosphite ester based on the total weight of the composition; and
   b) from 0.1 to 20% by weight of an amino functional organopolysiloxane based on the total weight of the composition, wherein said amino functional organopolysiloxane is of the formula:

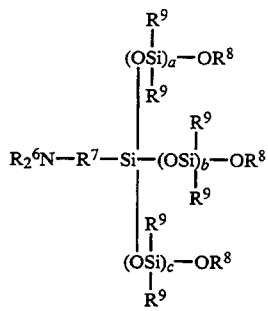

wherein each $R^6$ is independently selected from hydrogen, substituted and unsubstituted organic radicals, and radicals of the formula—$R^7NR^6{}_2$, wherein $R^6$ is as previously defined; $R^7$ is a divalent organic radical; each $R^8$ is independently selected from substituted and unsubstituted alkyl radicals having from 1 to 30 carbon atoms; each $R^9$ is an independently selected organic radical having from 1 to 13 carbon atoms; and a, b and c are, independently, 0 or a positive integer, wherein at least one of a, b and c is a positive integer.

9. The composition of claim 8 wherein said phosphite is bis(2,4-di-t-butylphenyl) pentaerythritol diphosphite.

10. A thermoplastic resin composition comprising the phosphite blend composition of claim 8 at a level of from 0.01% to 5% by weight based on the total weight of the resin composition.

11. A phosphite blend composition consisting essentially of
   a) from 25 to 99.9% by weight of at least one phosphite ester based on the total weight of the composition; and
   b) from 0.1 to 20% by weight of an amino functional organopolysiloxane based on the total weight of the composition wherein said amino functional organopolysiloxane is of the formula:

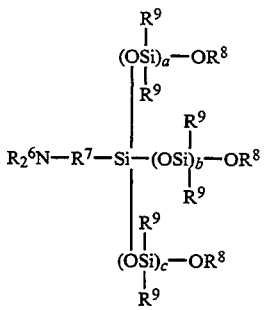

wherein each $R^6$ is independently selected from hydrogen, substituted and unsubstituted organic radicals, and radicals of the formula—$R^7NR^6{}_2$, wherein $R^6$ is as previously defined; $R^7$ is a divalent organic radical; each $R^8$ is independently selected from substituted and unsubstituted alkyl radicals having from 1 to 30 carbon atoms; each $R^9$ is an independently selected organic radical having from 1 to 13 carbon atoms; and a, b and c are, independently, 0 or a positive integer, wherein at least one of a, b and c is a positive integer.

12. An organic phosphite composition consisting essentially of:
   a. an organic phosphite particle comprising
      i) a solid organic phosphite core, and
      ii) an amino functional organo polysiloxane coating attached to said core, said coating protecting said phosphite core from moisture
   wherein said amino functional organopolysiloxane is of the formula:

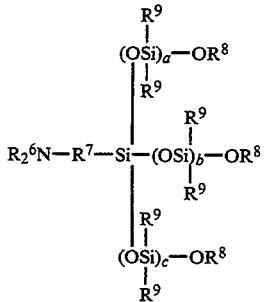

wherein each $R^6$ is independently selected from hydrogen, substituted and unsubstituted organic radicals, and radicals of the formula—$R^7NR^6{}_2$, wherein $R^6$ is as previously defined; $R^7$ is a divalent organic radical; each $R^8$ is independently selected from substituted and unsubstituted alkyl radicals having from 1 to 30 carbon atoms; each $R^9$ is an independently selected organic radical having from 1 to 13 carbon atoms; and a, b and c are, independently, 0 or a positive integer, wherein at least one of a, b and c is a positive integer.

13. An organic phosphite particle exhibiting enhanced hydrolytic stability, said particle consisting essentially of:
   i) a solid organic phosphite core, and
   ii) an amino functional organo polysiloxane coating surrounding said core
wherein said amino functional organopolysiloxane is of the formula:

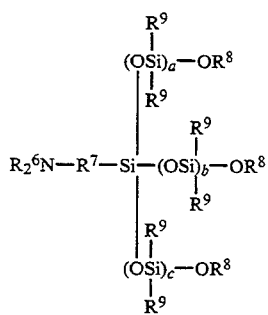

wherein each $R^6$ is independently selected from hydrogen, substituted and unsubstituted organic radicals, and radicals of the formula —$R^7NR^6_2$, wherein $R^6$ is as previously defined; $R^7$ is a divalent organic radical; each $R^8$ is independently selected from substituted and unsubstituted alkyl radicals having from 1 to 30 carbon atoms; each $R^9$ is an independently selected organic radical having from 1 to 13 carbon atoms; and a, b and c are, independently, 0 or a positive integer, wherein at least one of a, b and c is a positive integer.

14. The phosphite particle of claim 6 further comprising an intermediate layer comprising a solid phenolic antioxidant is located between said coating and said core.

15. A method for making a hydrolitically stable phosphite composition, said method comprising adding an amine functional organopolysiloxane to an organic phosphite wherein said amine functional organopolysiloxane has an amine equivalent of from 0.1 to 2.5.

* * * * *